J. DAIN.
CUTTING APPARATUS FOR HARVESTERS.
APPLICATION FILED JAN. 4, 1913.
1,210,910.
Patented Jan. 2, 1917.
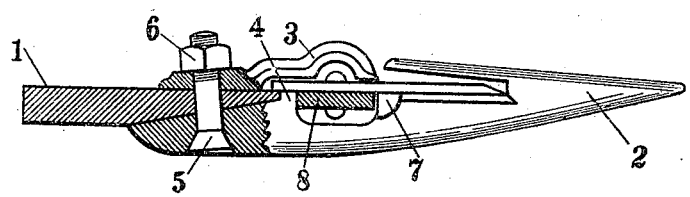
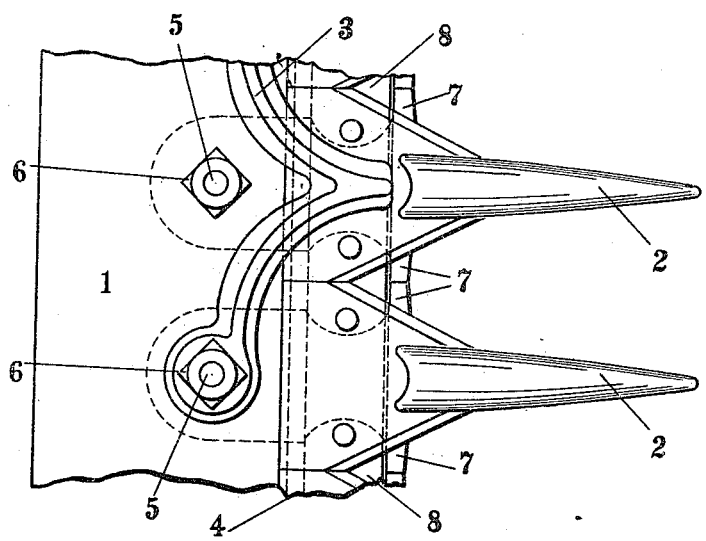

J. DAIN.
CUTTING APPARATUS FOR HARVESTERS.
APPLICATION FILED JAN. 4, 1913.
1,210,910.
Patented Jan. 2, 1917.
2 SHEETS—SHEET 2.
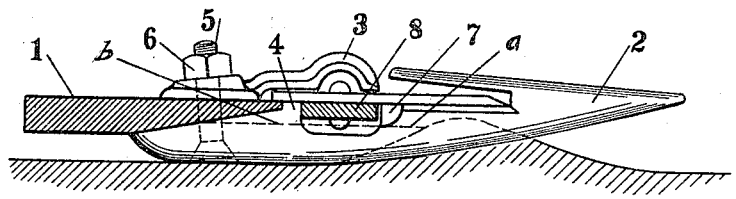
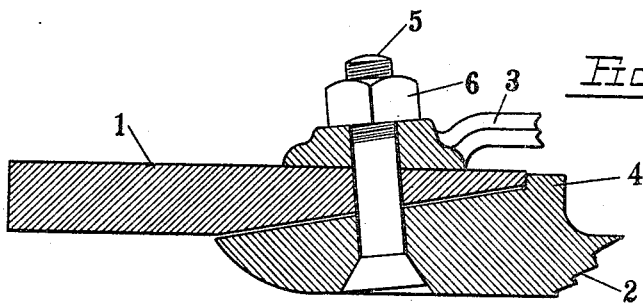

UNITED STATES PATENT OFFICE.

JOSEPH DAIN, OF MOLINE, ILLINOIS, ASSIGNOR, BY MESNE ASSIGNMENTS, TO DEERE & COMPANY, OF MOLINE, ILLINOIS, A CORPORATION OF ILLINOIS.

CUTTING APPARATUS FOR HARVESTERS.

1,210,910.  Specification of Letters Patent.  Patented Jan. 2, 1917.

Application filed January 4, 1913. Serial No. 740,156.

*To all whom it may concern:*

Be it known that I, JOSEPH DAIN, a citizen of the United States, residing at Moline, in the county of Rock Island and State of Illinois, have invented certain new and useful Improvements in Cutting Apparatus for Harvesters, of which the following is a specification, reference being had therein to the accompanying drawing.

My invention relates to improvements in cutting apparatus for mowers and other harvesting machines, and has for its object the form and assembly of the various parts to insure a closer joint with a minimum expense of manufacture.

A further object of my invention is to construct the apparatus so as to materially reduce the liability of clogging when cutting over mealy or soggy ground.

Referring to the drawings in which similar numerals indicate identical parts—Figure 1 is a plan view of a part of a finger-bar illustrating my improvements, Fig. 2 is a side elevation of the same in part section, Fig. 3 is a side elevation in part section, showing the apparatus passing over soft, uneven ground, and Fig. 4 is an enlarged detail section.

I have shown the finger-bar 1 in cross-section in Fig. 2, and the guard-finger 2 and clip 3 in part section the better to illustrate my invention; the guard-fingers are provided with the usual wings 7 as fenders for the cutter-bar 8.

As ordinarily constructed, finger-bars for mowers, reapers and other harvesting machinery are rectangular in cross-section, and the method usually employed in mounting guard-fingers thereon, together with the consequent thickness of the guard-finger, not only prevents close cutting, but allows an accumulation of soil in front of the finger-bar, contributing to a rapid wearing of the different parts of the mechanism. To overcome this condition I construct the finger-bar 1, as shown, with a bevel on its under side extending from its forward edge a sufficient distance rearwardly to present an easy slope.

The forward edge of the finger-bar 1 contacts as usual with a shoulder 4 on the guard-finger 2; at this particular joint the parts must be held rigidly together to preserve the effective operation and durability of the entire mechanism; under working conditions the contact of the finger-bar 1 with the shoulder 4 is liable to become loose, and in order to tighten it without the addition of other parts I make the bolt-holes in the finger-bar 1, the guard-finger 2 and the clip 3, at an angle rearwardly from the vertical, so that the bolt 5 is substantially at right angles to the bevel of the finger-bar 1. In assembling the parts, the bolt-holes in the finger-bar 1 and guard-finger 2 register when the front edge of the finger-bar first contacts with the shoulder 4 and before the bevel of the finger-bar and guard-finger come in contact, as shown in Fig. 4; a tightening of the bolt to bring the bevel surfaces together will at the same time increase the pressure of the front edge of the finger-bar against the shoulder 4 so that a tight and rigid joint is assured.

In Fig. 3 I have shown my device meeting with an uneven spot in soft or soggy ground. The guard-finger 2 has forced its way through the slight elevation of soil, making a depression therein of just the width of the finger, this will leave the obstruction its original height on each side of the guard-finger 2, and, as shown by the dotted line *a*, the wing 7 will contact with the elevation of soil pushing it under or ahead to clear the cutter-bar 8. In finger-bars as ordinarily used and rectangular in cross-section, the front edge of the finger-bar will next contact with the elevation of soil piling it up in front and causing it to pack in the usual channel in which the cutter-bar moves; in my finger-bar, however, with the long rearwardly extending bevel, the front edge of the bar will pass above the soil elevation, the latter meeting with the bevel on the under side of the bar 1 a considerable distance rearward of the front edge, as shown by the dotted line *b*, so that no soil will pile up or accumulate in front of the finger-bar 1 to clog the cutter-bar and destroy its efficiency.

I have found the structure shown and described to be highly efficient under every condition, the long rearwardly extending bevel of the finger-bar permitting the use of a thinner guard-finger so that the cut can be made closer to the ground, the rearward inclination of the bolt 5 holding the several parts in close and rigid engagement.

What I claim is—

1. A finger-bar having its rear edge of greater thickness than its front edge, a guard-finger secured to said finger-bar, a shoulder on the guard-finger against which the front edge of said finger-bar contacts, and means to increase the pressure of the front edge of the finger-bar against said shoulder as the finger-bar and guard-finger are drawn together.

2. A finger-bar having its rear edge of greater thickness than its front edge, a guard-finger secured to the lower side of said finger-bar, said guard-finger increasing in thickness forwardly the length of its connection with said finger-bar, a shoulder on the guard-finger against which the front edge of said finger-bar contacts, and a bolt inclined rearwardly from the vertical and adapted to hold said guard-finger and finger-bar together, the pressure of the contact of the front edge of said finger bar against the shoulder on the guard finger being maintained or increased by tightening said bolt.

3. A finger-bar having its rear edge of greater thickness than its front edge, a guard-finger secured on the lower side of said finger-bar, a shoulder on the guard-finger against which the front edge of said finger-bar contacts, a bolt inclined rearwardly from the vertical and securing said guard-finger and finger-bar together, the pressure of the contact of the front edge of said finger-bar against the shoulder on the guard-finger being maintained or increased by tightening said bolt.

4. A finger-bar beveled on its under side downwardly and rearwardly, a guard-finger having a shoulder thereon against which the front edge of said finger-bar contacts, said guard-finger being beveled downwardly and rearwardly from said shoulder, bolt-holes in said finger-bar and guard-finger substantially at right angles to their bevels and adapted to register when the front edge of said finger-bar and guard-finger contact, and a bolt in said bolt-holes to draw the bevels of the finger-bar and guard-finger together and increase the pressure of the front edge of the finger-bar against the shoulder on the guard-finger.

In testimony whereof I affix my signature, in presence of two witnesses.

JOSEPH DAIN.

Witnesses:
BERTHA A. MAURER,
W. G. DUFFIELD.

Copies of this patent may be obtained for five cents each, by addressing the "Commissioner of Patents, Washington, D. C."